(No Model.) 2 Sheets—Sheet 1.

R. H. MATHER.

SUPPORT FOR THE ARMATURES OF DYNAMO ELECTRIC MACHINES.

No. 321,991. Patented July 14, 1885.

Witnesses:
Frank H. Pierpont
Charles A. Safford

Inventor:
Richard H. Mather,
By Willard Eddy, Atty.

(No Model.) 2 Sheets—Sheet 2.

R. H. MATHER.

SUPPORT FOR THE ARMATURES OF DYNAMO ELECTRIC MACHINES.

No. 321,991. Patented July 14, 1885.

Witnesses:
Frank H. Pierpont,
Charles A. Safford

Inventor
Richard H. Mather,
By Willard Eddy,
Atty.

United States Patent Office.

RICHARD H. MATHER, OF WINDSOR, CONNECTICUT.

SUPPORT FOR THE ARMATURES OF DYNAMO-ELECTRIC MACHINES.

SPECIFICATION forming part of Letters Patent No. 321,991, dated July 14, 1885.

Application filed August 12, 1884. (No model.)

*To all whom it may concern:*

Be it known that I, RICHARD H. MATHER, a citizen of the United States, residing at Windsor, in the county of Hartford and State of Connecticut, have invented certain new and useful Improvements in Supports for the Armatures of Dynamo-Electric Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a firm and rigid support for the armature-shaft, including the armature, commutator, brushes, and pulley of a dynamo-electric machine, whether motor or generator, in such a manner as to obviate the necessity of leveling the machine or the armature thereof, as heretofore practiced, and at the same time to render the commutator and brushes more accessible than has been usual heretofore. These objects I accomplish by means of a cradle or frame consisting of two metallic rods, which are firmly secured to the field-magnet, and are rigidly connected with each other by means of yokes which furnish the bearings for the armature-shaft.

Figure 1:
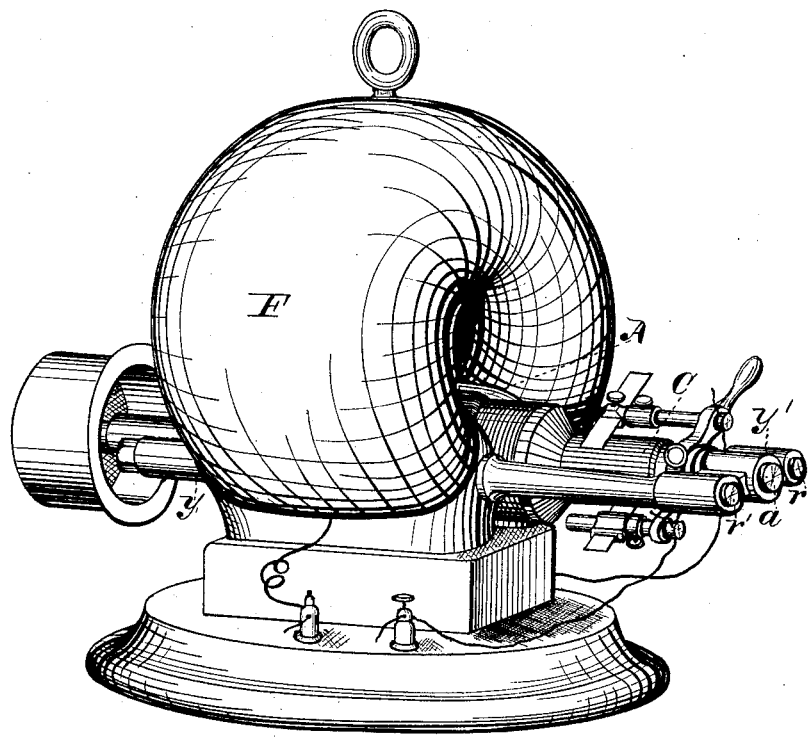
Figure 2:
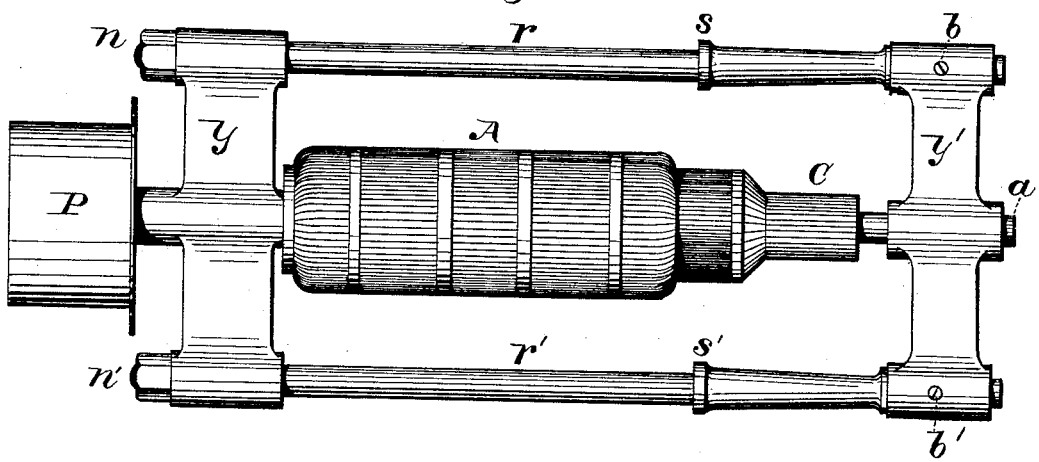
Figure 3:
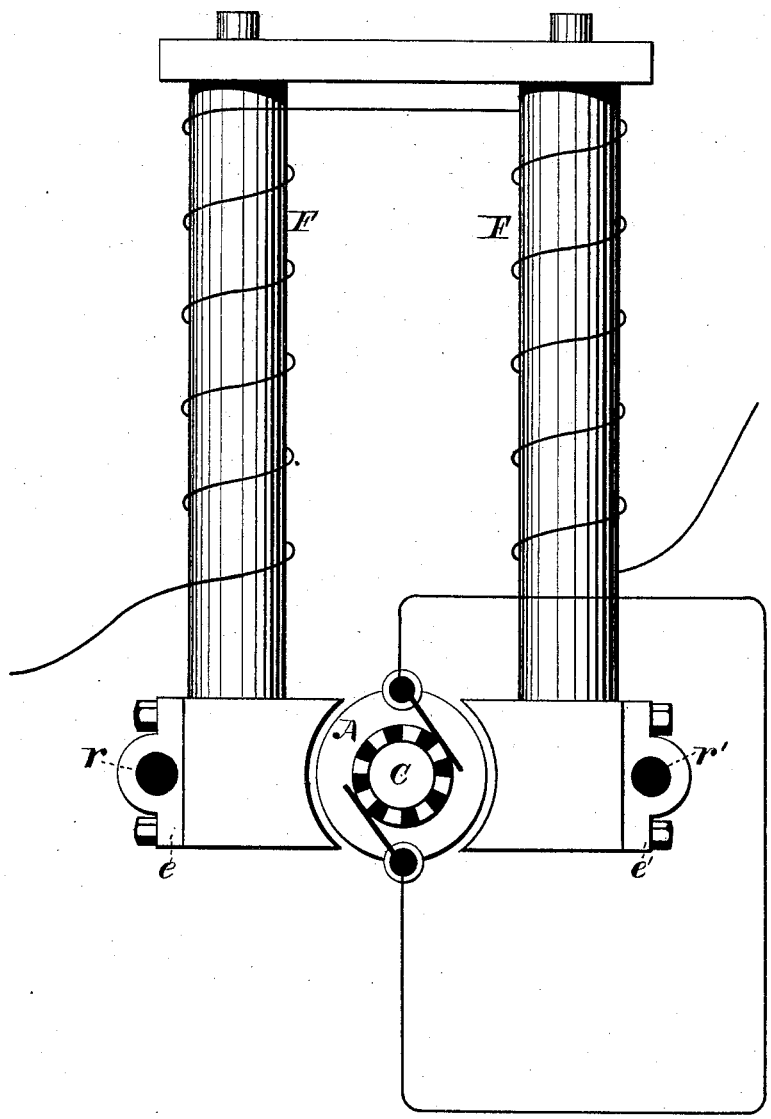

I proceed to point out the best mode of constructing and applying my invention. In the accompanying drawings, Figure 1 is a perspective view of a dynamo-electric machine embodying my invention. Fig. 2 is a top view of the cradle of the same, with the armature, commutator, shaft, and pulley supported thereby; and Fig. 3 is a diagrammatic view of a dynamo-electric machine having the rods of the cradle attached to the field-magnet by means of lugs or ears.

In these drawings F is the field-magnet, which is of any convenient form for the application of the cradle in the manner hereinafter described. $a$ is the arbor or shaft, which carries the armature A, the commutator or collector C, and the pulley P.

Two metallic bars or rods, $r\ r'$, constitute the side rails of the cradle, being of greater length than the armature, and entering the yokes Y Y', as hereinafter described. These rods are large and strong enough to give all necessary firmness of support to the parts sustained thereby, and are provided with nuts $n\ n'$ and shoulders $s\ s'$.

Y Y' are yokes of brass or other non-magnetic material, perforated at either end to receive the rods $r\ r'$ in the position shown, and containing each a journal-box for the shaft $a$. The yoke Y is of convenient form to be brought to a solid contact with the field-magnet in the position shown in Fig. 1. The rods are held in position in yoke Y' by set-screws $b\ b'$.

In constructing the machine a hole is bored through each of the pole-pieces of the field-magnet, as in Fig. 1, or through ears $e\ e'$ bolted thereto, as in Fig. 3, in a direction parallel to the axis of the armature. The rods $r\ r'$ are then driven firmly into these holes, in the direction from right to left in Fig. 2, until stopped by the contact of the shoulders $s\ s'$ with the pole-pieces or ears aforesaid, as the case may be. The yokes bearing the shaft, &c., are then placed in position upon the rods $r\ r'$, as shown in Figs. 1 and 2. The nuts $n\ n'$ are turned up until the yoke Y is thereby firmly clamped against the solid metal of the magnet or of the ears thereof, as the case may be; and the yoke Y' is held firmly in the position shown in Figs. 1 and 2 by the set-screws $b\ b'$. The rods $r\ r'$ may be supported on or by the pole-pieces of the field-magnet in any other suitable manner. The brushes may be supported in any convenient manner from the yoke Y'. The frame or cradle $r\ r'$ Y Y' is by this construction firmly held together in the desired fixed position relative to the field-magnet, whether the latter be leveled or not, so that during the operation of the machine the armature is held in like immovable position with all necessary steadiness, and at the same time the commutator and brushes are in an easily accessible position.

If the yokes Y Y', or either of them, be made of magnetic material, the machine is still operative, but less effectively, for in that case part of the magnetism of the field-magnet, instead of passing through the armature, is shunted through these yokes.

I am aware that prior to my invention dynamo-electric machines have been made with bars passing through the field-magnet, as in the machine for which Letters Patent No.

294,458 were issued March 4, 1884, to G. W. Fuller, and with bars and yokes, respectively, made of a single piece of metal; as in the machine for which Lettters Patent No. 157,299 were issued December 1, 1874, to W. S. Sims. Therefore I do not claim such bars or yokes, broadly; but what I do claim as my invention, and desire to secure by Letters Patent, is—

1. For the support of the armature of a dynamo-electric machine, a quadrilateral frame or cradle whose side rails, being parallel metallic bars, are held in immovable positions relatively to each other by means of two horizontal metallic yokes, each of which being formed in a single piece is firmly clamped upon both of said bars, and contains one of the journals of the armature-shaft, substantially in the manner and for the purpose specified.

2. In a dynamo-electric machine, a field-magnet whose core consists of a single piece of iron, in combination with a four-sided cradle or frame, consisting of the parallel rods $r\ r'$ and the horizontal journal-bearing yokes $Y\ Y'$, each of said yokes being formed of a single piece of metal, and clamped firmly upon one end of each of said rods, substantially in the manner and for the purpose specified.

3. A dynamo-electric machine, whether motor or generator, in which the field-magnet core is formed in a single piece, and in which the armature-shaft is journaled in two yokes, which are held in fixed positions relatively to the field-magnet and to each other by means of the parallel rods $r\ r'$ which pass through said yokes and through said field-magnet, substantially in the manner and for the purpose specified.

In testimony whereof I affix my signature in presence of two witnesses.

RICHARD H. MATHER.

Witnesses:
WILLARD EDDY,
CHARLES A. SAFFORD.